United States Patent [19]

McHugh et al.

[11] Patent Number: 5,509,504
[45] Date of Patent: Apr. 23, 1996

[54] VELOCITY REGULATED, OPEN CURRENT LOOP, VARIABLE VOLTAGE, VARIABLE FREQUENCY, LINEAR INDUCTION MOTOR DRIVE FOR AN ELEVATOR CAR DOOR

[75] Inventors: Thomas M. McHugh, Farmington; David W. Barrett, East Hartland; Edward E. Ahigian, West Hartford; Jerome F. Jaminet, South Windsor; Thomas He, Unionville; Richard E. Peruggi, Glastonbury; Thomas M. Kowalczyk, Farmington; Richard E. Kulak, Bristol, all of Conn.

[73] Assignee: Otis Elevator Company, Farmington, Conn.

[21] Appl. No.: 223,920

[22] Filed: Apr. 6, 1994

[51] Int. Cl.⁶ .................................................. B66B 13/14
[52] U.S. Cl. .......................... 187/316; 187/287; 318/466; 318/811
[58] Field of Search .................................. 187/316, 296, 187/293, 295; 318/749, 466–470, 798–815, 687, 135; 49/120, 118, 117

[56] References Cited

U.S. PATENT DOCUMENTS

| | | |
|---|---|---|
| 3,462,883 | 8/1969 | Reeks et al. . |
| 3,891,907 | 6/1975 | Lenzkes et al. ............... 318/369 |
| 4,305,481 | 12/1981 | Hmelovsky et al. ............ 187/29 R |
| 4,786,765 | 10/1989 | Karita ........................... 16/102 |
| 5,131,506 | 6/1992 | Mizuno et al. ................. 187/103 |
| 5,136,228 | 8/1992 | Yamada et al. ................ 318/808 |
| 5,172,518 | 12/1992 | Yoshino ......................... 49/360 |
| 5,278,486 | 1/1994 | Kim ............................... 318/811 |
| 5,373,120 | 12/1994 | Barrett et al. .................. 187/316 |
| 5,400,240 | 3/1995 | Araki ............................. 363/97 |

FOREIGN PATENT DOCUMENTS

| | | |
|---|---|---|
| 0031721 | 7/1981 | European Pat. Off. . |
| 0614844 | 9/1994 | European Pat. Off. ....... B66B 13/14 |

*Primary Examiner*—Peter S. Wong
*Assistant Examiner*—Robert Nappi

[57] ABSTRACT

An elevator car door is moved by a variable voltage, variable frequency linear induction motor which is driven open current loop to achieve a desired velocity profile indicated by an incremental linear encoder, with washed out proportional and integral gain. A magnetizing current insufficient to overcome the weight of the door is added in quadrature with the linear force current, and frequency is determined open loop in a predetermined fashion. Pulse width modulation voltage control signals are utilized to apply fixed voltages of correct polarity through a low pass three phase filter to the windings of the motor for correct intervals of time so as to synthesize desired sinusoidal winding currents. A boost of current is provided following each zero crossing of the sinusoidal winding currents to overcome lags therein. A ramp down of voltage avoids dropping the door at the end of door opening and door closing.

4 Claims, 8 Drawing Sheets

VELOCITY REGULATED, OPEN CURRENT LOOP, VARIABLE VOLTAGE, VARIABLE FREQUENCY, LINEAR INDUCTION MOTOR DRIVE FOR AN ELEVATOR CAR DOOR

TECHNICAL FIELD

This invention relates to a control system of regulating a linear induction motor for an elevator car door utilizing position feedback for velocity regulation in an open current loop to provide a simple, yet sophisticated elevator door operating system.

BACKGROUND ART

Typical elevator door operating mechanisms, such as that shown in commonly owned U.S. Pat. No. 4,305,481, employ a rotary motor which drives a complex lever mechanism. In attempts to simplify, and thereby reduce the initial cost, installation, adjustment and maintenance costs, the use of linear induction motors has been suggested as in U.S. Pat. No. 3,891,907 and in commonly owned copending U.S. patent application Ser. No. 029,203 filed Mar. 10, 1993. The use of a linear induction motor eliminates the need for any mechanical parts other than an electrically conductive secondary to which the door may be affixed, and which will drive the door in the open and closed direction in dependence upon currents applied to the windings of the linear induction motor primary. Utilizing a digital computer for generating the variable phase motor current waveforms for driving a variable voltage, variable frequency linear induction motor results in waveforms which are only approximations of the pure sinusoidal waveforms that produce optimum linear induction motor performance. Distortion in digitally-produced waveforms result in acoustic noise and increased motor heating. In the art, it has been known to utilize advanced techniques to improve the current drives by means of closed loop current control implemented through digital signal processing. However, closed loop current control significantly increases the complexity of the processing as well as the cost of the apparatus itself.

DISCLOSURE OF INVENTION

Objects of the invention include provision of a low cost, simple, yet sophisticated linear induction motor elevator door operating system.

According to the present invention, position feedback is utilized to provide a velocity command in an open current loop control for a variable voltage, variable frequency linear induction motor driving an elevator car door. According to the invention further, the control algorithm is executed in a series of fixed time intervals utilizing only pulses indicative of incremental changes in position to aggregate a current position and a current velocity for comparison with a desired velocity as a function of current position. Use of proportional and integral gain and a low pass washout filter enable smooth basic door operation without the need for current feedback. The control utilizes a predetermined slip frequency as a function of commanded force to provide pulse width modulated voltage to the windings of the motor.

The present invention provides an extremely sophisticated, smooth and reliable control at extremely lost cost.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
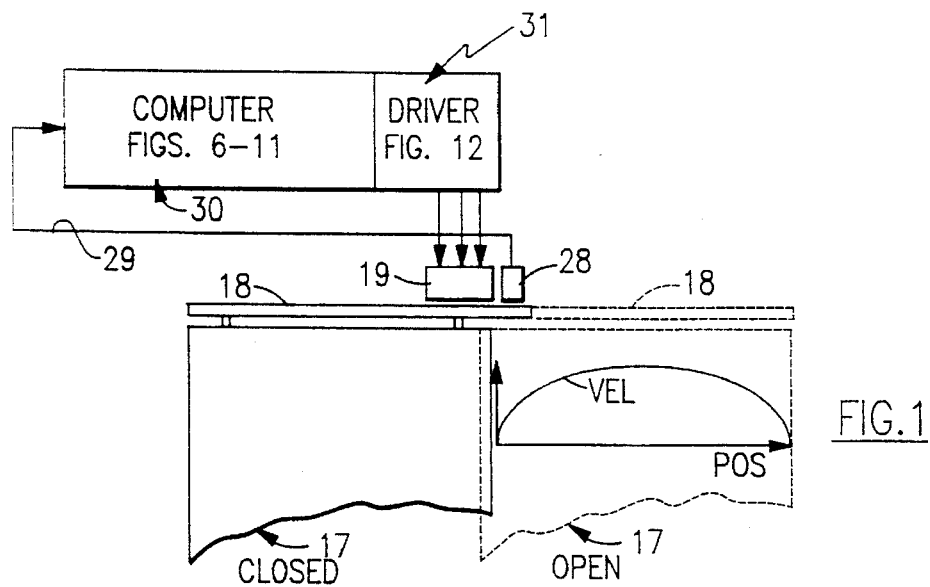
FIG. 1 is a simplified, partially broken away schematic diagram of an elevator door operating system employing a linear induction motor, according to the invention.
Figure 2:
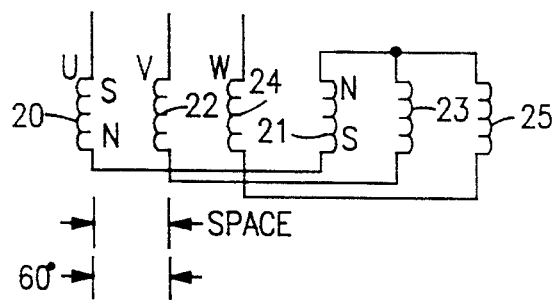
FIG. 2 is a schematic illustration of the windings in the linear induction motor of FIG. 1.

Referring now to FIG. 1, an elevator door 17 is shown in solid lines in the closed position and is shown in dotted lines in the open position. The door 17 is fastened to a secondary 18 of a linear induction motor, the primary 19 of which is secured to the elevator car. In the example of this invention, the linear induction motor primary 19 has six windings (FIG. 2) 20–25 connected in pairs—20, 21; 22, 23; 24, 25—so as to form three windings U, V, W, each of which produces a north pole and a south pole which are 180 electrical degrees apart, as shown by the winding U. The windings are always driven in three phase relationship, with the windings having phases 120° apart from each other. At a given point in time, such as that illustrated in FIG. 3, the winding U may have a relatively small negative current flowing therein at the same time that the winding V may have nearly maximum current flowing therein and the winding W may have an intermediate negative current flowing therein. There could be multiple sets of six windings per set, as is known.

Figure 3:
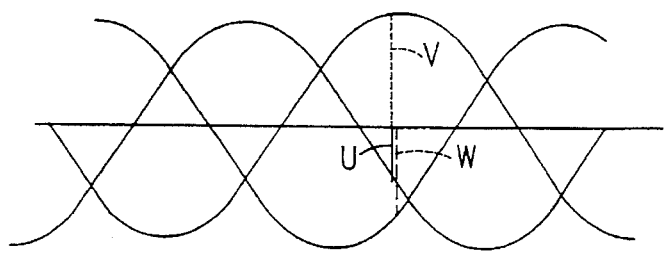
FIG. 3 is a waveform of the current relationship of the three windings in FIG. 2.
Figure 12:
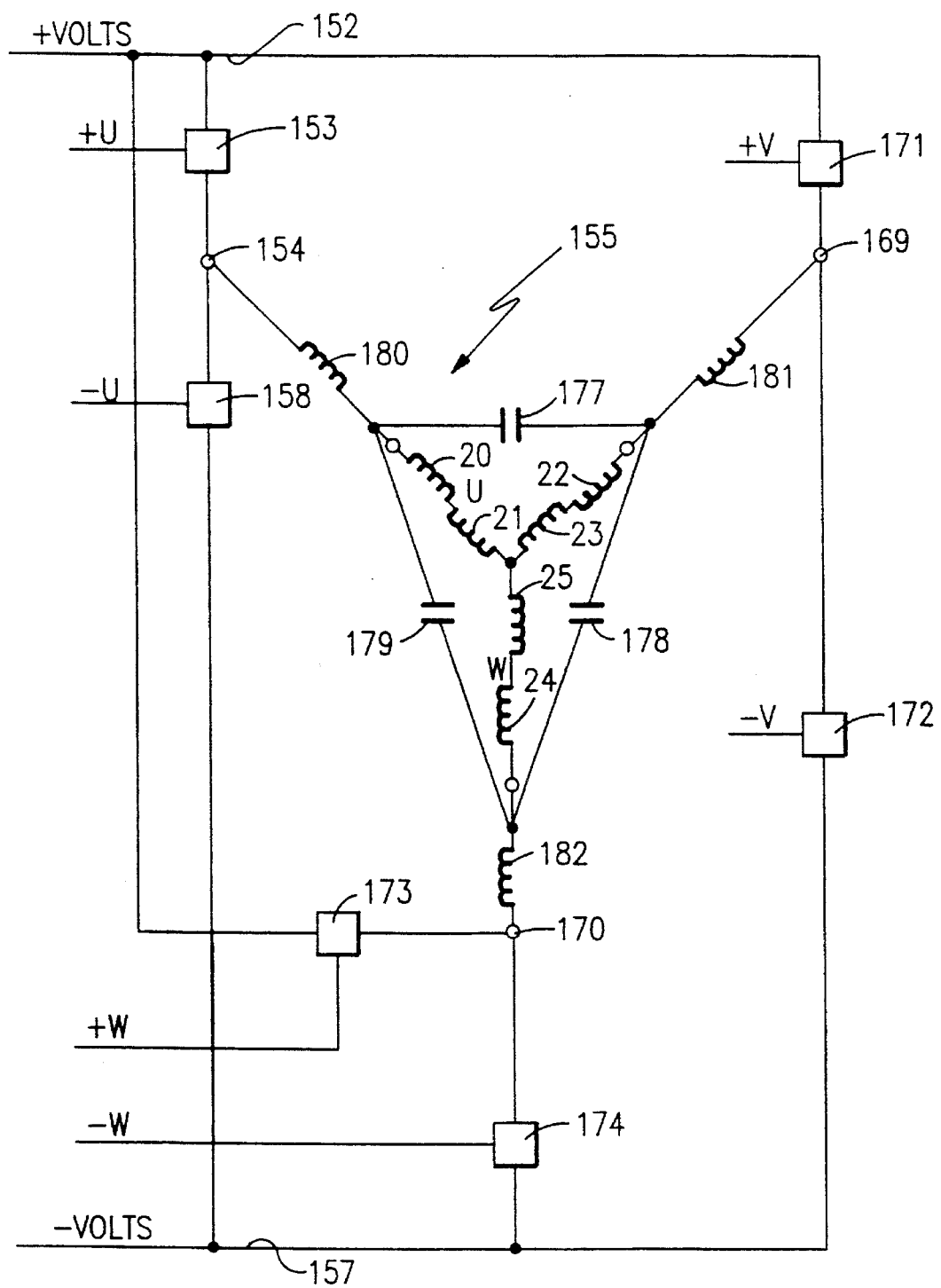
FIG. 12 is a schematic block diagram of the driver of FIG. 1, including a filter, and its connections with the windings of the linear motor of FIG. 1.

The secondary 18 generally comprises a conductive strip, within which secondary currents are formed by a magnetic field, the conductive strip having a magnetic backing (which may either move with the door or be stationary on the building, as may suit any implementation of the invention), to conduct magnetic flux between the related poles of the linear motor primary (such as the poles associated with windings 20 and 21). The secondary 18 may also have an optical encoder strip disposed thereon (not shown) which may be read by a photodetector 28 which provides pulses over a line 29 to a computer 30. The number of pulses provided on the line 29 over a fixed interval of time, which is one millisecond in this embodiment, is indicative of the distance traveled in that time, and therefore the velocity of the door, and the aggregation of which is indicative of the current position of the door. As described with respect to FIGS. 6–11, hereinafter, the computer 30 utilizes this information to derive a force command which will achieve a desired velocity vs. position motion profile for the door, and converts this to signals for selectively turning positive and negative voltages on and off in a driver 31, which is described more fully hereinafter with respect to FIG. 12. The voltages provided by the driver 31 will result in the desired currents as illustrated in FIG. 3.

Figure 4:
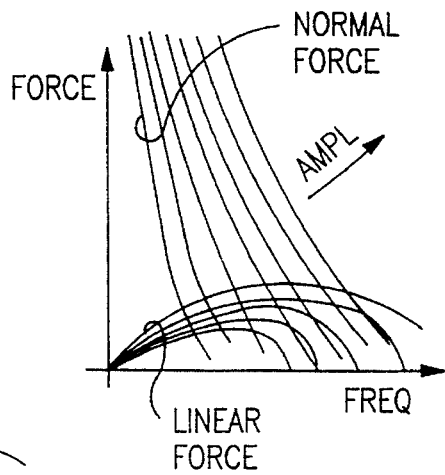
FIG. 4 is a simplified waveform illustration of normal force and linear force as a function of frequency and amplitude of the current in the linear induction motor of FIG. 1.

As is known, a single sided linear induction motor cannot be provided with a linear force (one which will move the secondary from the left to the right as shown in FIG. 1, and the reverse thereof) without an attendant normal force which can be two times to five times greater than the linear force. The normal force just causes the primary to act like any solenoid and attract the magnetic material of the secondary toward the primary. In the art, the linear force has typically been chosen to provide a desired acceleration, by selecting the frequency and amplitude of alternating current in the primary windings that will provide such a desired result. The relationship between normal force and linear force is set forth in FIG. 4, very crudely, for illustrative purposes, as a function of frequency and amplitude of the currents in the windings of the primaries. The selection of frequency and amplitude that will provide the desired linear force, from among a wide variety of combinations thereof which will do so, is generally made to provide maximum electrical efficiency in the application in which the linear induction motor is to be used.

Figure 5:
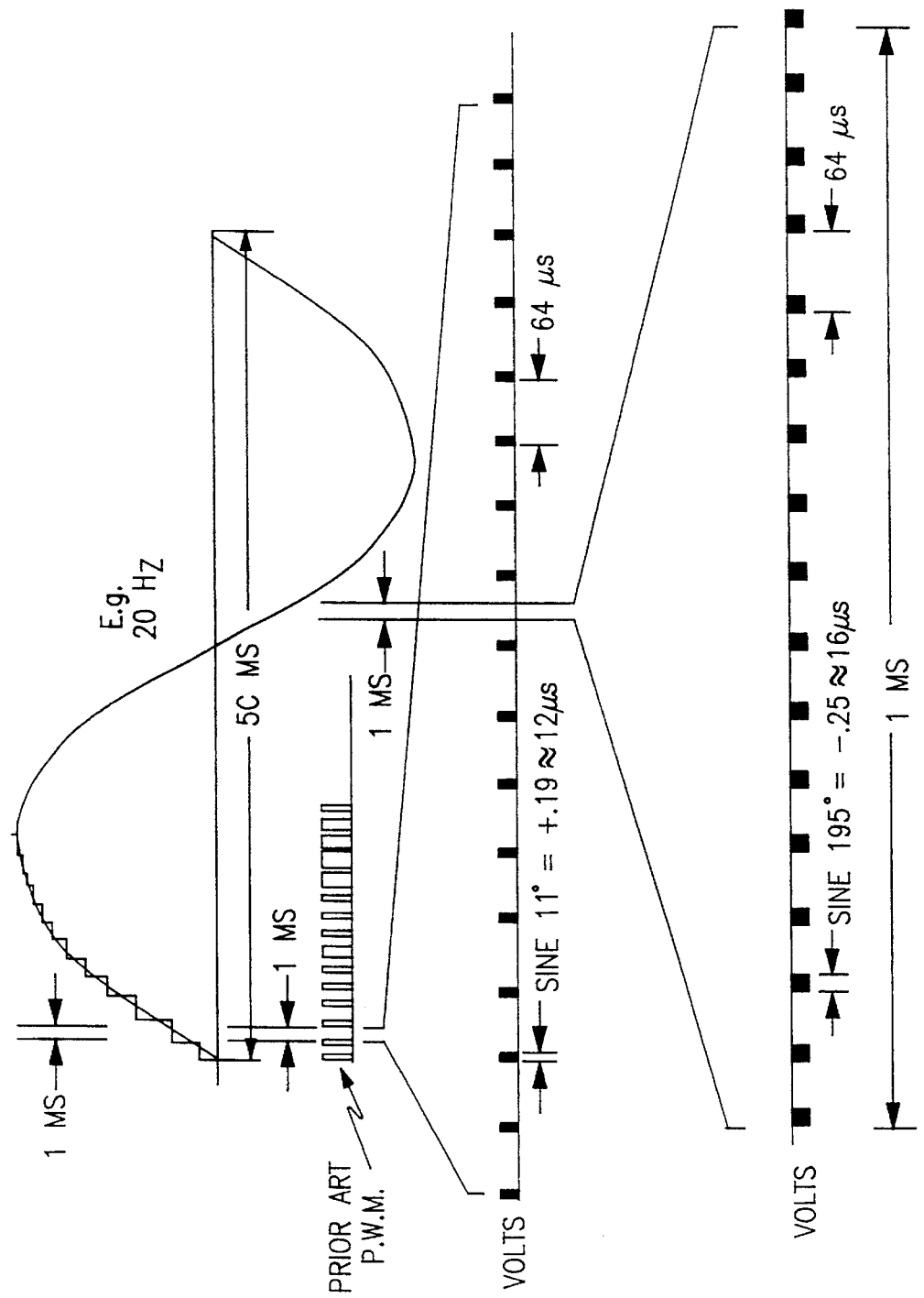
FIG. 5 is a series of waveforms on related time bases, illustrating pulse width modulation within control cycles.

FIG. 5 illustrates a typical sine wave of AC current which may be used to drive a linear induction motor. As illustrated on the sine wave, it has long been known to generate a sine wave synthetically with stair steps, the magnitude of which is the average magnitude of a sine wave during the period of the step. Also illustrated is prior art pulse width modulation (P.W.M.) in which a constant magnitude (equal to the greatest magnitude of the sine wave, although not so illustrated in FIG. 5) is pulsed into the winding for periods of time chosen to create an average magnitude across the period of time (one millisecond herein) equal to the corresponding stair step shown on the sine wave. In the embodiment herein, instead of pulse widths that vary between 0 and 1 millisecond, pulse widths vary between 0 and 64 microseconds are utilized, the same pulse width obtaining throughout an entire one millisecond period. The present invention uses 16, 16 microsecond pulses, controlled by a four megahertz clock, in order to eliminate audible noise. Pulse width modulation reduces the partially on and partially off, heat wasting condition of the transistor switches which apply voltage to the linear induction motor primary windings. Thus, to create the approximate sine wave at 11°, during the second one millisecond period of a 50 millisecond, 20 Hertz driving current, 16 pulses of about 12 microseconds each will be provided as shown in the middle of FIG. 5. Similarly, at 195°, 16 pulses of negative voltage, each having a 16 microsecond duration would be applied to a winding. Thus, the current in the windings is achieved in the present embodiment by applying a fixed amplitude voltage (which is invariant throughout the life cycle of the apparatus according to the invention) for periods of time in any one millisecond interval which are a function of the desired current (and therefore force) times the sine of the angle at the present point along a sinusoidal drive command function, which is 120° separated among the three windings (as in FIG. 3). In the present embodiment, the normal force may be utilized to offset a clockwise rotary torque which a rightward force on the upper right corner of the door 17 will cause about the door's center of gravity, when the door begins opening, by means of providing a proper vertical force toward the linear induction motor primary 19 as a result of the normal force, which is a counterclockwise torque about the center of gravity of the door. All of this may be as is described in the aforementioned prior copending U.S. patent application.

Figure 6:
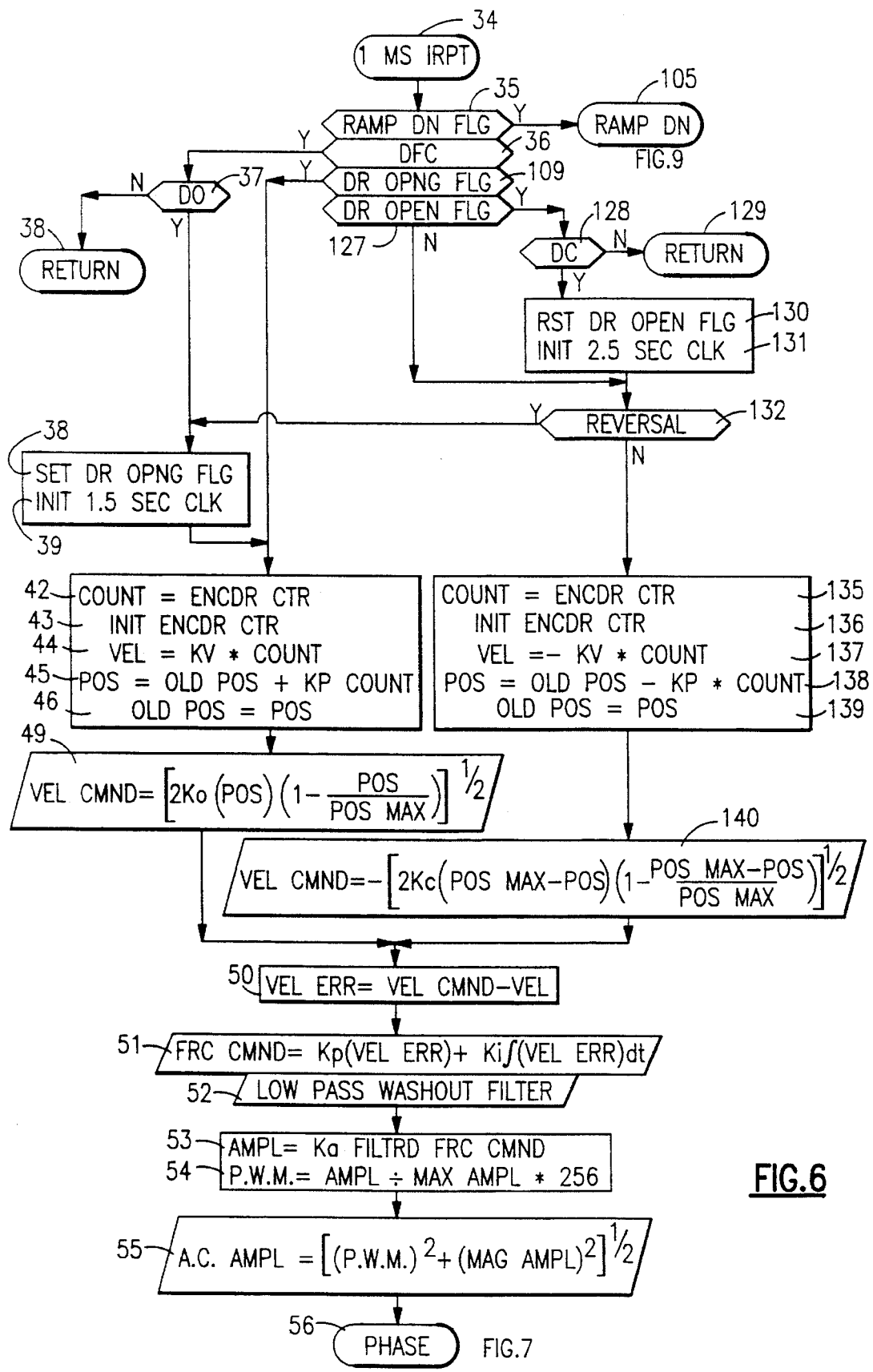
FIGS. 6–9 are a logic flow diagram of a one millisecond interrupt routine utilized within the computer of FIG. 1.

Referring now to FIG. 6, every millisecond, a real time interrupt is provided to reach a one millisecond interrupt routine through an entry point 34. A first test 35 determines if a ramp down flag has been set or not. This is a flag which is set when the door has been fully opened or fully closed and defines a period time in which the remaining voltages are reduced in a slow downward ramp, so as to avoid dropping the door, as described more fully with respect to FIG. 9, hereinafter. Whenever the door has just been opened and whenever the door has just been closed, the flag 35 might be set, and therefore the result of the test 35 might be affirmative. But most of the time, the flag will not be set and a negative result of test 35 will reach a test 36 to determine if the door is fully closed or not. As contemplated in this embodiment, the test 36 may be based upon the normal elevator door physical switch which indicates complete door closure; however, door position or any other indicator of the door being completely closed could be utilized, if desired. In a normal case, the elevator may be somewhere else than at a landing, and the doors will be fully closed. In such a case, an affirmative result of test 36 will reach a test 37 to see if a door open command has been sent to the door controller by the elevator controller. If the door is fully closed (test 36) and there is no command to open the door (test 37), the one millisecond interrupt routine of FIG. 6 ends, and the computer may revert to other programming through a return point 38. Eventually, the elevator will approach a landing and when it is within the landing zone, the door open command will be provided to the door controller and the result of test 37 will be affirmative. This reaches a pair of steps 38, 39 which set a door opening flag (utilized as described hereinafter) and initiate a 1.5 second clock, which is used to determine when door operation should be complete; in this embodiment, it is assumed that the door moves about 55 cm and will be fully opened in about 1.4 seconds. Of course, this timing must be adjusted in any case to suit the particular door operating system in which the present invention is utilized. The 1.5 second clock may be initiated for a 2.5 second timeout during door closure; it is thus referred to as a 2.5 second clock and as a 1.5/2.5 second clock herein.

The actual processing to formulate the commands and apply voltages to the primary 19 begins with a step 42 in which the pulse count of an encoder counter, which is advanced by the optical position sensor pulses on the line 29 (FIG. 1), is memorized as a term called "count"; then that counter is reinitialized immediately thereafter in a step 43, to begin a new, one-millisecond count. A step 44 calculates the average door velocity over the last one-millisecond period of time, as a velocity constant (KV) times the count. A step 45 determines the current position of the door by adding an old position (the place where it was at the start of the prior one millisecond period) to an appropriately adjusted indication of the difference in position obtained during the present one millisecond, which is a position constant (KP) times the count. And then, the old position is updated to be equal to the new position in a step 46, for use during the calculations in the next one millisecond period. A subroutine 49 generates a velocity command using a door opening constant (Ko), in a manner to cause a velocity profile as a function of door position which is the same as that in the aforementioned copending application. This profile is shown superscribed over the leading edge of the door in FIG. 1. In the usual fashion, the velocity error is taken in a step 50 to be the difference between the calculated velocity command and the present velocity (determined in step 44). Then, a force command is generated as a proportional and integral function of the velocity error in a subroutine 51, utilizing a proportional constant (Kp) and an integral constant (Ki). The force command is processed through a low pass washout filter subroutine 52 in a well-known fashion, and the filtered result is multiplied in a step 53 by an amplitude constant (Ka) to generate an amplitude factor indicative of current amplitude required to achieve the desired linear force in accordance with whichever relationship of amplitude and frequency has been chosen (FIG. 4) to accelerate the linear motor in the desired velocity. This amplitude is converted, in a step 54, to a number indicating a pulse width representing (as in FIG. 5) the desired current amplitude, by taking a proportional fraction of the number 256 (of course other numbers could be used to determine the resolution of processing, as desired).

As is known, the linear induction motor requires a magnetizing current in order to establish fields to create secondary currents in the conductive secondary 18. This is a fixed alternating current for each winding U, V, W of the primary 19. This current is electrically in quadrature with the linear force current and the two are combined as the square root of the sum of the squares in a subroutine 55. Since the magnetizing current amplitude is fixed, and is the same in every performance of the one millisecond interrupt routine, it can simply be a stored number, equivalent to the pulse width magnitude number generated in the step 54, resulting in a pulse width related number as the outflow from the subroutine 55. In accordance with the invention, the magnitude of the magnetizing current may be approximately one-quarter of the magnetizing current typically utilized in the prior art to achieve maximum electrical efficiency. In the present embodiment, this may be expressed as a pulse width count of about 32. After the subroutine 55 is completed, the program advances to a phase portion thereof, as illustrated in FIG. 7, through a transfer point 56.

Figure 7:
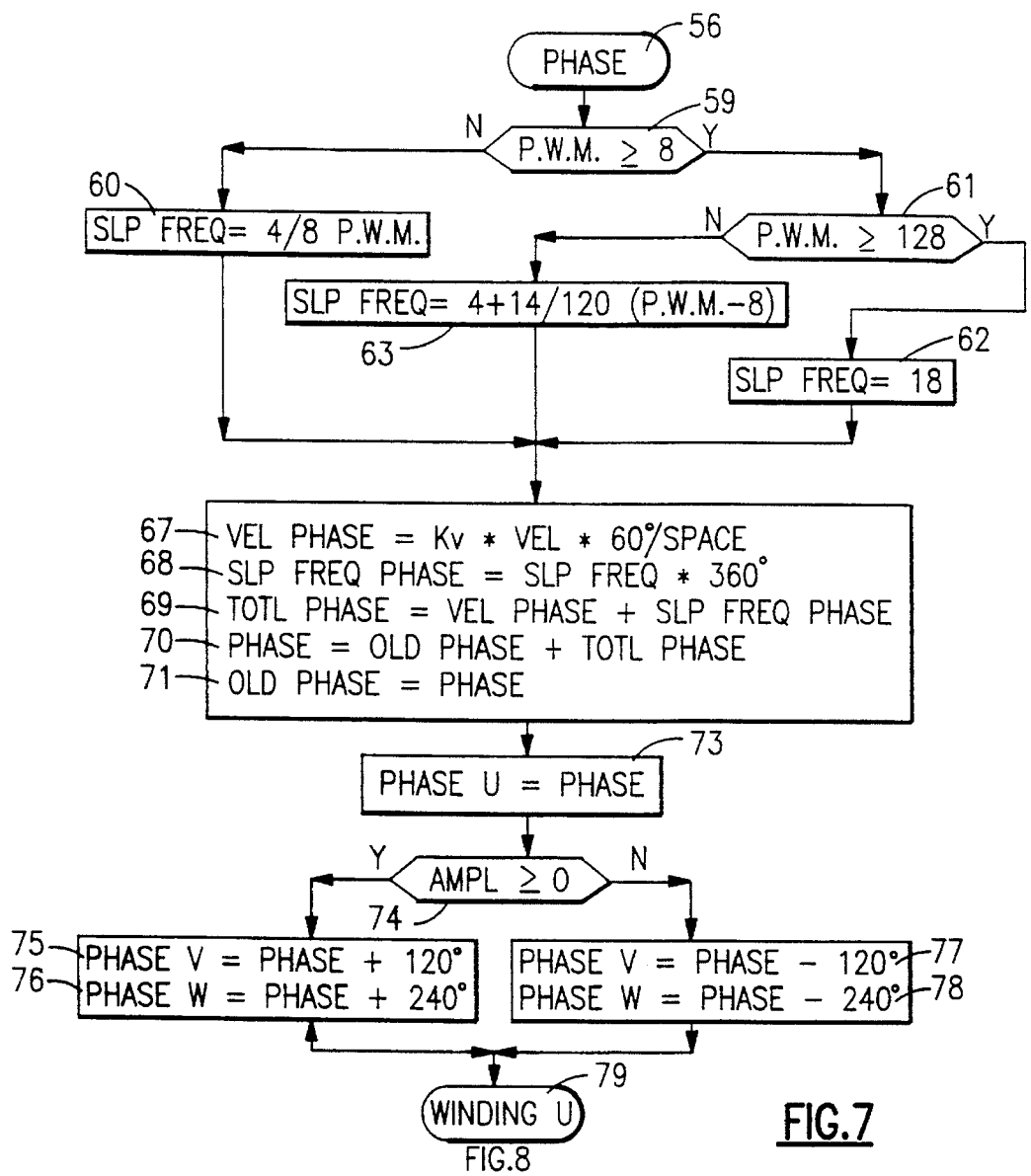
Figure 13:
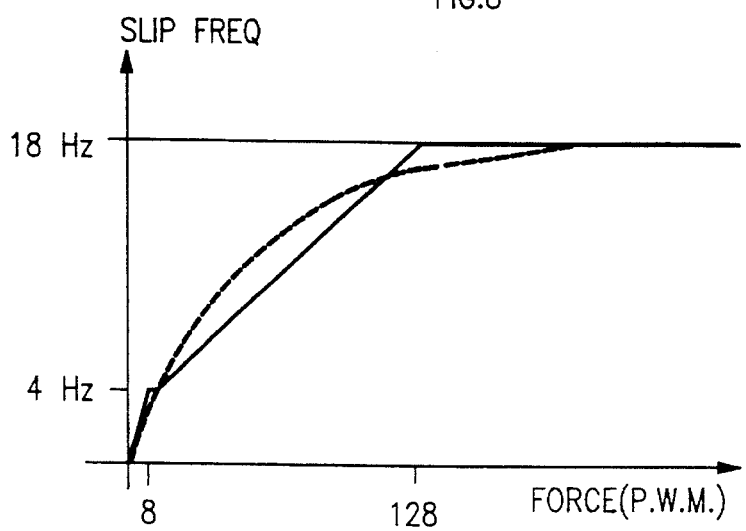
FIG. 13 is a diagram of slip frequency required to provide intended force.

In FIG. 7, a first test 59 determines if the force-derived amplitude, as a generated count in step 54 (FIG. 6), is equal to or greater than 8. As seen in FIG. 13, this is the first break point of a straight line approximation of desired slip frequency as a function of force, which may ideally be as shown by the dotted curve of FIG. 13. However, it has been determined that for elevator door opening, the straight line approximation shown in solid line in FIG. 13 is adequate. This simply simplifies the processing. However, a table look-up or square root formula calculation of an ideal current (dotted curve) could be used if desired in any implementation of the present invention. If the P.W.M. value is not equal to or greater than 8, the desired slip frequency is simply the straight line slope of 4 Hertz per 8 counts, and is so generated in a step 60. But if the count is greater than 8, an affirmative result of test 59 reaches a test 61 to determine if the count is equal to or greater than 128. If it is, an affirmative result of test 61 reaches a step 62 to simply generate slip frequency as 18 Hertz. But if the count is between 8 and 128, a negative result of test 161 reaches a step 63 in which the slip frequency is set equal to 4 Hertz plus the slope times the P.W.M. minus 8 counts. This follows the solid line of FIG. 13.

The slip frequency so generated is the frequency of slip between the secondary and the primary of the linear induction motor which is necessary in order to create the attractive force that will move the secondary under the primary in the desired fashion, as is known. Such a frequency created in the primary will not, once the door is moving, be effective because of the door motion itself. In other words, the phase change required to create force must be in addition to that which results from motion of the secondary with respect to the primary. To accommodate this situation, a phase factor related to the relative velocity between the secondary and the primary is generated in a step 67 as a velocity constant (Kv) times the velocity, ratioed to 60 electrical degrees per unit of space between the windings, which in an exemplary embodiment may be on the order of 16 millimeters. A slip frequency phase is generated from the relationship of 360° per cycle, in a step 68. The total phase is then taken in a step 69 as the sum of the phases generated in the steps 67 and 68. The actual phase which is to be achieved during the present cycle is the summation of the phase previously achieved along the sine wave of FIG. 5) together with the current total phase requirement, which is established in a step 70. And then the present phase of step 70 is saved for the next one-millisecond interrupt processing cycle in a step 71.

As described with respect to FIG. 3 hereinbefore, the phase for the three windings are related in the same fashion in each instance. The phase generated in step 70 is taken in a step 73 to be the phase of winding U (arbitrarily); any other relationship could be used if desired. Then a test 74 determines if the force on the door should be positive or negative (opening or closing) as a function of the sign of the amplitude of step 53. If the door is opening, so the amplitude is positive (in the convention herein), then the phase of windings V and W are established in steps 75 and 76 as being 120° and 240° advanced, in the convention of the present embodiment. On the other hand, if the door is closing and the force is negative, a negative result of test 74 will cause windings V and W to be −120° and −240° retarded from phase U, respectively. And then a portion of the 1 millisecond interrupt routine which relates to winding U, in FIG. 8, is reached through a transfer point 79.

Figure 8:
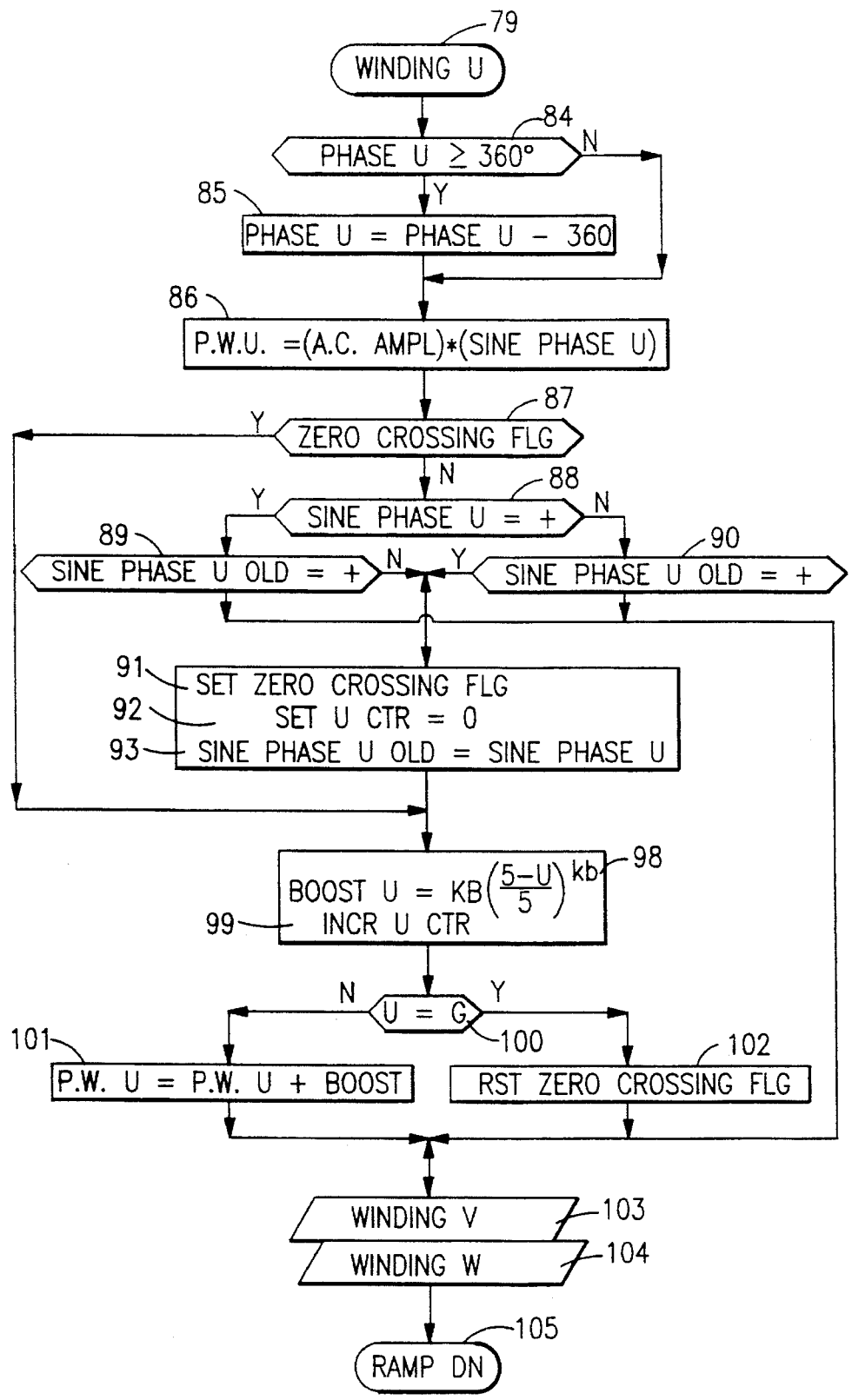

In FIG. 8, the phase of winding U is normalized to be between 0° and 359° by virtue of a test 84 and a step 85. Then a pulse width for winding U is established in a step 86 as the AC amplitude of step 55 (which is expressed as a pulse width count) times the sine of the phase for winding U (as described hereinbefore with respect to FIG. 4), (in a step 86).

Figure 14:
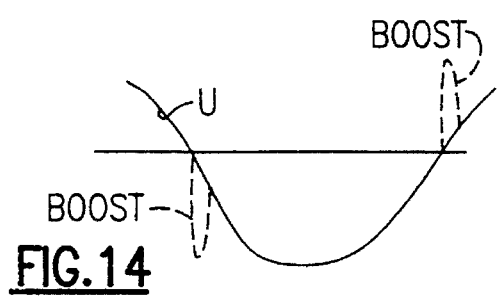
FIG. 14 is a simplified waveform illustrating boost in accordance with the present invention.

In FIG. 14, the AC driving current for winding U is shown in a solid curve. According to the invention, it has been learned that, for whatever reason (possibly related to adjacent pole fields and magnetic hysteresis), a crossover from positive to negative halves of the sine wave of a driving voltage, as well as from negative to positive halves of the sine wave of a driving voltage, results in a current lag, unless it is compensated for by closed-current-loop control. In the present embodiment, there is no current feedback indicative of the actual current in the motor, and therefore there can be no correction for the current lag which occurs at zero crossings. Therefore, in accordance with the present invention, the current lags are essentially eliminated by providing a voltage boost in the first few cycles immediately following each crossover throughout the door opening operation and throughout the door closing operation. To achieve this, the zero crossings are sensed, and a flag is set; for the next several cycles, some fraction of the maximum amplitude is applied by adding equivalent counts to the pulse width during those few cycles.

In FIG. 8, a test 87 determines if the zero crossing flag has been set or not. Except in the few cycles following a crossover, the flag will not have been set so a negative result reaches a test 88 to determine if the trigonometric sine of the phase for winding U is a positive or negative number. If it is a positive number, an affirmative result of test 88 reaches a test 89 to determine if the phase of the U winding had a positive sine in a next prior one-millisecond cycle. If it did, that means that there has not been a zero crossover, so a number of steps are bypassed. But if the prior cycle had a negative sine, which would be true at the point 90 of FIG. 14, then there is a negative result of test 89 which will reach a step 91 to set the zero crossing flag, a step 92 to set a U counter equal to zero (for counting the few cycles that the boost signal is applied), and a step 93 where the sine of the phase for the U winding is remembered for use in the next cycle (sine phase U old).

Then the boost number for winding U is generated in a step 98 as a fraction raised to an exponent times some count, KB, which may be a significant fraction of a typical maximum amplitude, such as a count of between 60 and 90, or perhaps a count of 75 in the present embodiment. The fraction is the number of cycles that boost is to be applied, which is five in this embodiment, although the number may vary from four to eight or so, minus the setting of the U counter (initialized at zero in the step 92). The exponent (kb) may be one, or it may be some other number between ½ and 2, as is deemed appropriate in any implementation of the present invention. What is necessary is to devise the parameters for the step 98 in such a fashion so that the current in the windings will in fact be very close to sinusoidal. Once the boost factor is generated in the step 98, the value of the U counter is incremented in a step 99. Then a test 100 determines if the U counter has been advanced to a setting of 6, or not. In the first cycle after a zero crossing, it will not be set to 6, and a negative result of test 100 will reach a step 101 in which the pulse width value for the U winding (established in step 86) has added thereto the value of boost calculated in the step 98. As seen in FIG. 14, during the first millisecond after a zero crossing, the boost value will be the full value of KB e.g., a count of 75, unless the exponent (Kb) is less than one. In the second millisecond cycle following the crossover, the fraction of step 98 will be ⅘; in the third cycle ⅗, and so forth until in the fifth cycle, the fraction is 0. Then the U counter is incremented in step 99 to 6, so an affirmative result of test 100 will reach a step 102 where the zero crossing flag is reset. This allows the program to again be looking for zero crossings in the tests 88–90, as described hereinbefore. Then a subroutine 103 for winding V, and a subroutine 104 for winding W, each of which is the same as the steps and tests 84–102 described with respect to winding U, are performed. When this is complete, a ramp down portion of the one millisecond interrupt routine is reached in FIG. 9 through a transfer point 105.

Figure 9:
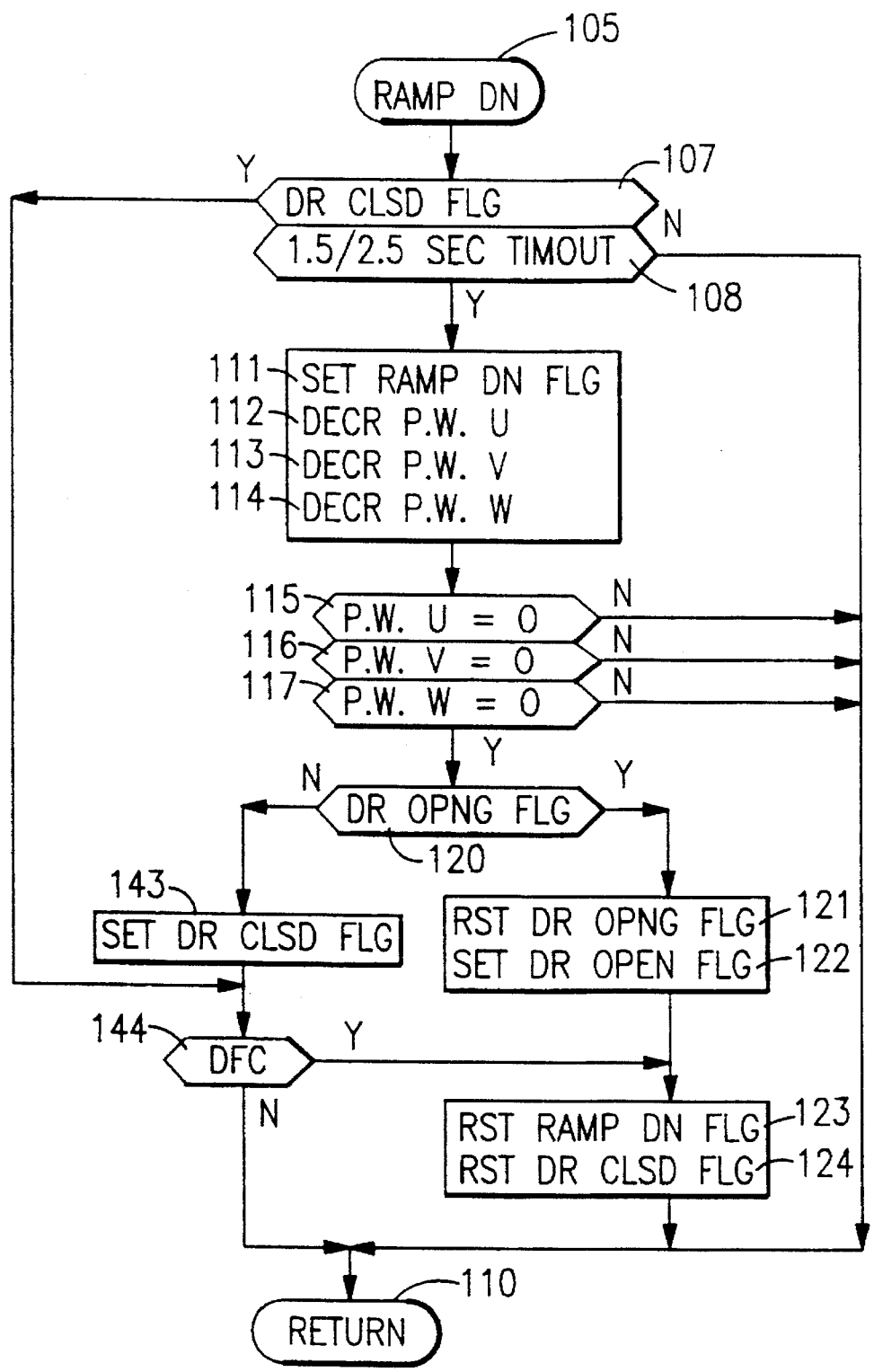

In FIG. 9, a first test 107 determines if a door closed flag has been set or not. This flag is only set when the door has just been closed. Assuming that the flag is not set, a negative result of test 107 reaches a test 108 to see if the 1.5/2.5 second clock has timed out or not. In the general case, as the door is opening, it will not have timed out, so the end of the one millisecond interrupt routine is reached and other programming is reverted to through a return point 110. Although the door has been opened or whenever the door has been closed, 1½ seconds after initiation after the opening or the closing cycle (FIG. 6) the 1.5/2.5 second clock will time out and an affirmative result of test 109 will reach a step 111 which set the ramp down flag and a series of steps 112–114 in which the pulse width values for windings U, V and W are decremented by one count. The ramp down flag is used in page 6 to determine that the bulk of the one millisecond interrupt routine should be bypassed, as described hereinbefore. After decrementing, each of the pulse width values are tested to see if they are reduced to zero in a series of steps 115–117. If any of the values is non-zero, a negative result will cause the return point 110 to be reached.

In the next following one millisecond interrupt, the routine will be entered at entry point 34 of FIG. 6. Because the ramp down flag has been set in step 111 as a result of the 1.5 second time out, an affirmative result of test 35 will reach the transfer point 105 in FIG. 6 so that the ramp down portion of the one millisecond interrupt routine in FIG. 9 is reached directly. Since the 1.5/2.5 second clock will always be in a time out condition except when it is counting through a door moving period, test 109 will continue to be affirmative reaching the steps 111–114 where the ramp down flag is redundantly set (without any harm) and the pulse widths are once again decremented. Again the tests 115–117 determine if all of the pulse widths have been reduced to zero or not. Initially, they may not thereby reaching the return point 110.

In a subsequent one millisecond interval, the one millisecond interrupt routine is again reached in FIG. 6 through the entry point 34, and an affirmative result of the test 35 will again jump the program to the ramp down transfer point 105 and again reach the test 109.

No matter what the values may have in them at the end of 1.5 seconds, they will certainly be reduced to zero within 256 milliseconds because the maximum count used in this embodiment is always less than 256. At some point in time (generally within a few cycles after the 1.5 second timeout), all of the pulse width values will be reduced to zero so a series of affirmative results of the tests 114–116 will reach a test 120 which determines if the door is opening or not by testing the door opening flag set in step 38. If the door has been opening, the flag is set and an affirmative result of test 120 reaches a step 121 to reset the door opening flag and a step 122 to set a door open flag. The door open flag indicates that the door is open and will remain so until a door close command is received from the elevator controller, as described more fully hereinafter. Because there is no longer any need to ramp down the counts in the steps 112–114, a step 123 will reset the ramp down flag, and a step 124 will reset a door close flag (the purpose of which is described hereinafter), redundantly, but with no harm. Then, the computer reverts to other programming through the return point 110.

Once the ramp down flag is reset in the step 123, the next time that the one millisecond interrupt occurs, a negative result of tests 35, 36 and 109 will reach a test 127 to see if the door open flag is set. Since it has been set in step 122, the routine will look for a door close command in a test 128. While the door is open and passengers are transferring in and out (for some period of time determined by the elevator controller as well as the door open button within the elevator car), there will be no door close command so a negative result of test 128 will cause other programming to be reverted to through a return point 129.

Eventually, the elevator controller will command that the door be closed and the next one millisecond interrupt will find an affirmative result of test 128 and thereby reach a step 130 which will reset the door open flag and a step 131 which will initiate the 2.5 second clock. This is the beginning of a door closing operation. The door closing may take 2 plus seconds due to the requirement to limit the total inertia of the door, when closing, for safety reasons, as is known. So long as the door is closing, in each cycle a test 132 is reached to determine if a passenger has caused a door reversal, by interrupting the light beam between the two doors, operating a safety shoe, or the like. If a door reversal has occurred, the door closing operation is aborted at whatever stage it may be in, and a door opening operation is initiated. Regardless of where the door happens to be, whenever a reversal occurs, the signal processing described hereinbefore with respect to FIGS. 6–8 for a door opening operation will be carried out. This poses no problem at all since the routine is a position loop, and it will pick up the closing operation at the position in which the door is in. There may be some large incremental phases, velocity error and the like, but this will simply result in the processing quickly recovering into a proper door opening routine.

If there is no door reversal, a negative result of test 132 will reach a series of steps 135–139 which are the same as steps 42–46 except for the fact that the velocity and the incremental position are negative (heading in the closing direction). A subroutine 140 generates a negative velocity command as a function of a closing constant (Kc) and the difference between maximum position and current position, otherwise similar to the subroutine 49. Then the steps and subroutines 50–55 are performed as before to come up with the desired AC amplitude, expressed as a count representative of pulse width.

In FIG. 7, the same steps and tests 59–73 are performed as in the door opening operation described hereinbefore since these are not direction sensitive. Then the test 74 determines that the amplitude of step 53 is not positive, and a negative result of test 74 reaches the steps 77, 78 to generate the phase for windings V and W as being –120° and –240° from the phase of winding U.

In FIG. 8, the steps and tests 84–102 and the subroutines 103 and 104 are the same in the closing direction as described hereinbefore with respect to the opening direction. In the first pass through FIG. 9, the door closed flag 107 will not be set since the door is simply starting to close and has not become closed as yet. The 1.5/2.5 second timeout will not have occurred so a negative result of test 108 causes other programming to be reverted to through the return point 110.

In the next one millisecond period, the one millisecond interrupt program is reached in FIG. 6 through the entry point 34. In this case, affirmative results of all of the tests 35, 36, 109 and 127 will cause the test 132 to be reached to determine if there is a reversal or not. Assuming there is no reversal, the one millisecond interrupt routine will be performed as before. This will continue to occur until, finally, the 1.5/2.5 second clock times out, as indicated by an affirmative result of test 108 in FIG. 9. Then, the ramp down flag will be set in step 111 and the decrementing and testing of the pulse width values for the three windings will occur in the steps 112–114 and tests 115–117. Some number of cycles after the 1.5/2.5 second clock has timed out, the pulse widths will have been reduced to zero, so an affirmative result of the tests 115–117 will reach the test 120. In this case, since the door is closing, the door opening flag is not set and a negative result will reach a step 143 which sets a door closed flag. This flag is used in this particular embodiment simply to allow synchronism between the routine of FIG. 9 and a physical switch, common on all elevators, which indicates that the door is fully closed. The setting of that switch is determined in a test 144. In subsequent passes through the one millisecond interrupt routine, the ramp down flag (FIG. 6) and door closed flag (test 107, FIG. 9) will reach the test 144. If the physical switch has not yet been closed, a negative result of test 143 will reach the return point 110. Eventually, the door fully closed switch will be closed and an affirmative result of test 144 will reach the steps 123, 124 where the ramp down flag is reset and the door closed flag (set in step 143) is also reset. Notice that the fact that the door closed flag is also reset at the end of a door opening operation is irrelevant.

The one millisecond interrupt routine has generated two numbers for each of the windings U, V and W. One of these numbers is the pulse width generated in step 86 and perhaps augmented in step 101, of FIG. 8, and the other of these numbers is the phase, which is normalized by steps and tests 84, 85 in FIG. 8. The phases are used in generating the pulse widths, so all that remains to be used relative to phase is the sign of the trigonometric sine of the phase, to determine if the motor winding is to be driven with a positive or negative half cycle of the driving sine wave.

Figure 10:
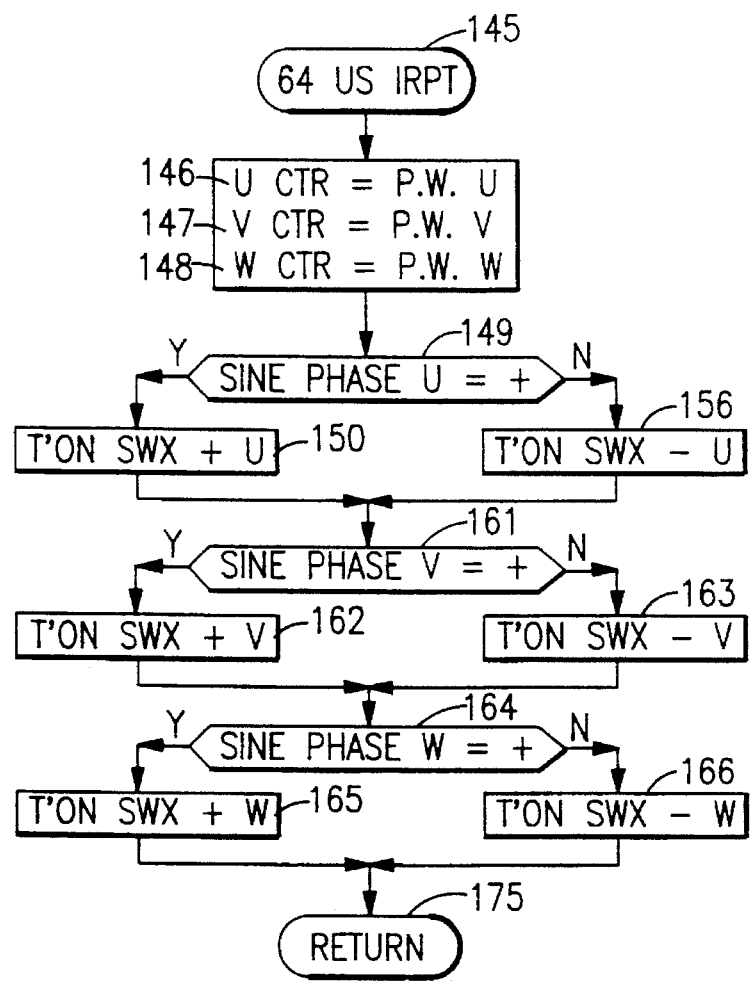
FIG. 10 is a logic flow diagram of a 64 microsecond interrupt routine utilized in the computer of FIG. 1.
Figure 11:
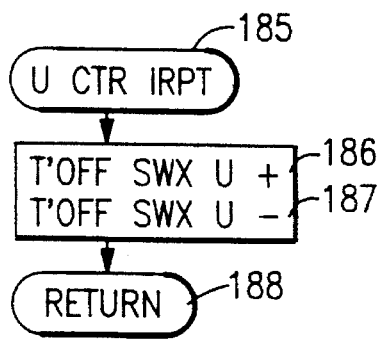
FIG. 11 is a logic flow diagram of a pulse width counter interrupt routine for winding U, utilized in the computer of FIG. 1.

In FIG. 10, a 64 microsecond interrupt routine is reached through an entry point 145, and a series of steps 146–148 set respective counters of the U, V and W windings to the pulse width generated in steps 86 and 101 for the respective winding. Then, the sign of the trigonometric sine of the phase of the U winding is tested in a test 149. If the sign is positive, this means that a positive voltage should be applied to the U winding, (20, 21, FIG. 2) of the primary 19 (FIG. 1) of the linear induction motor. This is achieved by a step 150 which connects a source of fixed, positive voltage (FIG. 12) on a line 152 through a suitable switch 153 to an input terminal 154 (related to the U winding) of a filter 155. On the other hand, if test 149 determines that the sign of the sine of the phase for the U winding is not positive, then a step 156 will be reached to cause application of a fixed, negative voltage from a source 157 through a switch 158 to the terminal 154. Similarly, tests and steps 161–166 in FIG. 10 will cause positive or negative voltage to be applied from the sources on lines 152, 157, respectively, to additional terminals 169, 170 of the filter 155, through switches 171–174. In FIG. 10, when all counters have been set and three switches turned on, other programming is reverted to through a return point 175.

The filter 155 is interposed (in this embodiment) between the switches 153, 158, 171–174 and the windings 20–25 of the linear induction motor primary 19. The filter consists of three capacitors 177–179, connected, in delta configuration, across pairs of windings (U, V; V, W; W, U). Between each switch and the corresponding windings, a choke 180–182 prevents the capacitors 177–179 from representing short circuits across the switches 153, 158, 171–174. The capacitors and chokes of the filter 155 are so selected as to represent a low pass filter which significantly attenuates frequencies above about 140 Hertz; this break point frequency is chosen since frequencies below 140 Hertz are not audible to humans. The filter 155 filters out harmonics of the basic door current frequency, which is shown in FIG. 5 as 20 Hertz, but which may range between 0 and 24 Hertz in a normal application of the present invention.

As illustrated in FIG. 5, each winding is given, within any one millisecond period, a series of about 16 pulses, each having a pulse width indicative of the amplitude of the sine wave applicable to the particular winding. The timing of these pulse widths is achieved simply by the fact that the U, V and W counters, which are set to the correct pulse width in steps 146–148 of FIG. 10, are decremented, and when they are reduced to zero, each will cause a related interrupt, such as the U counter interrupt for the U winding illustrated in FIG. 11. Whenever the pulse width is complete for the U winding, the U counter will cause the related interrupt to be reached in FIG. 11 through an entry point 185, and all that happens is that a pair of steps 186, 187 will turn off the plus U switch 153 and the minus U switch 158 (regardless of which one was on), and then cause other programming to be reverted to through a return point 188. Similar counter interrupt routines are provided (not shown) for the V winding and the W winding.

The present invention utilizes a unique combination of apparatus, control algorithms and techniques to provide an extremely simple, low cost, low maintenance, elevator car door opening system, which may be tailored in various respects to provide extremely smooth and quiet operation. The invention includes, inter alia, selection from among apparatus, control algorithms and techniques available in the art to provide the unique combination which results in the overall high performance, low cost system described herein.

The foregoing is a simplified description of physical arrangements and logical and arithmetic functions which may be utilized to practice the present invention. The logic flow diagrams should not be taken to be literal equivalents of computer software to be used in implementing the invention, but rather as illustrative of one exemplary embodiment which may be implemented with well-known programming techniques. The present invention has been described with respect to particular exemplary numbers and values for the purposes of illustration, merely. Obviously, embodiments utilizing other numbers and values may be implemented as desired to maximize the benefit of use of the present invention in any particular embodiment thereof. In some instances, table lookup may be utilized instead of calculations at several points in the routines disclosed herein, all in an obvious fashion. The invention has been described as used with a linear induction motor having vertical poles in the primary, and with a horizontal secondary disposed beneath the primary. This invention is also useful with other types of linear induction motors, such as one which has horizontal poles and a secondary which is displaced horizontally from the primary.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of driving a linear induction motor, the secondary of which is connected to an elevator car door, comprising:

cyclically, in each of a series of fixed unit time periods a) providing a given number of electrical pulses per unit distance of elevator door travel;

b) determining the number of pulses provided in said step a);

c) accumulating the count of pulses determined in said step b) to provide a position signal;

d) determining average velocity over said unit time period from the number of pulses determined to have been accumulated in said step b);

e) providing a velocity command as a function of position utilizing the position provided in step c);

f) providing a velocity error as the difference between the velocity command generated in step e) and the average velocity determined in said step d);

g) generating a force command as a proportional and integral function of said velocity error;

h) determining a predetermined desired phase as a function of said force command;

i) determining the phase differential experienced by the secondary of said linear induction motor as a consequence of the velocity determined in said step d);

j) providing a total phase signal in response to the summation of phases provided in said steps h) and i);

k) providing a pulse width signal as a function of the vector sum of a predetermined magnetizing current and said force command, times the sine of said total phase signal; and l) repetitively in a second series of time periods, connecting an invariant DC voltage to a winding of said linear induction motor primary having the same polarity as the sign of the sine of said total phase signal for a length of time determined by said pulse width signal.

2. A method according to claim 1 wherein said linear induction motor is a three phase linear induction motor, and said step j) provides three phase signals related to said total phase signal and related to each other by 120°, and said step k) includes providing pulse width signals as a function of said vector sum times the sine of each of said three phase signals; and said step l) includes connecting an invariant DC voltage to three windings of said motor having the same polarity as the sign of the sine of the corresponding one of said three phase signals, each for a length of time determined by the corresponding pulse width signal.

3. A method according to claim 1 wherein said second series of time periods comprise a number of time periods for each of said fixed unit time periods.

4. A method according to claim 1 wherein said second series of time periods comprise on the order of 16 time periods within each of said fixed unit time periods.

* * * * *